(12) United States Patent
Edwards et al.

(10) Patent No.: US 8,192,010 B2
(45) Date of Patent: *Jun. 5, 2012

(54) METALLIC INK JET PRINTING SYSTEM FOR GRAPHICS APPLICATIONS

(75) Inventors: Paul A. Edwards, Ypsilanti, MI (US); Sandra Zinke, Alpena, MI (US); Joshua Samuel, Ann Arbor, MI (US); Matthew Tennis, Howell, MI (US)

(73) Assignee: Electronics For Imaging, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,368

(22) Filed: Feb. 18, 2011

(65) Prior Publication Data

US 2011/0141189 A1 Jun. 16, 2011

Related U.S. Application Data

(63) Continuation of application No. 11/519,432, filed on Sep. 12, 2006, now Pat. No. 7,891,799.

(60) Provisional application No. 60/784,107, filed on Mar. 17, 2006, provisional application No. 60/716,378, filed on Sep. 12, 2005.

(51) Int. Cl.
*G01D 11/00* (2006.01)

(52) U.S. Cl. ............................ 347/100; 347/102; 347/95

(58) Field of Classification Search ............ 347/95–100, 347/102; 106/31.13, 31.6
See application file for complete search history.

(56) References Cited

U.S. PATENT DOCUMENTS

| | | | |
|---|---|---|---|
| 5,958,169 A | 9/1999 | Titterington et al. | |
| 6,071,334 A | 6/2000 | Wider et al. | |
| 6,550,906 B2 | 4/2003 | Ylitalo | |
| 6,589,636 B2 | 7/2003 | Emslander et al. | |
| 6,616,741 B1 | 9/2003 | Sawa et al. | |
| 6,638,995 B1 | 10/2003 | Gelarden | |
| 6,691,610 B1 | 2/2004 | Wilen | |
| 6,720,042 B2 | 4/2004 | Ylitalo et al. | |
| 7,025,453 B2 | 4/2006 | Ylitalo et al. | |
| 2002/0182376 A1 | 12/2002 | Mukherjee et al. | |
| 2003/0054139 A1 | 3/2003 | Ylitalo et al. | |
| 2003/0079649 A1 | 5/2003 | Kelly-Rowley et al. | |
| 2003/0107635 A1 | 6/2003 | Kinning et al. | |

(Continued)

FOREIGN PATENT DOCUMENTS

JP 2002-169486 6/2002

(Continued)

OTHER PUBLICATIONS

PCT/US2006/035132 Invitation to Pay Additional Fees with Partial International Search Report; mailed Feb. 1, 2007.

*Primary Examiner* — Matthew Luu
*Assistant Examiner* — Rut Patel
(74) *Attorney, Agent, or Firm* — Michael A. Glenn; Glenn Patent Group

(57) ABSTRACT

A multi-phase system for creating a metallic effect on a substrate, comprising applying to the substrate a first ink jet ink comprising a dispersion of reflective metallic particles in a suitable carrier system, to form a reflective coating layer; and applying a second ink jet ink over the reflective coating layer to form a protective coating layer. Optionally, an undercoat layer is printed on the substrate prior to applying the first ink jet ink. The second ink jet ink comprises at least one crosslinkable polymer or is otherwise energy curable. The second ink jet ink optionally imparts a color to the metallic image.

28 Claims, 3 Drawing Sheets

U.S. PATENT DOCUMENTS

| | | |
|---|---|---|
| 2003/0203135 A1 | 10/2003 | Emslander et al. |
| 2003/0207025 A1 | 11/2003 | Emslander et al. |
| 2003/0224128 A1 | 12/2003 | Ylitalo et al. |
| 2003/0224150 A1 | 12/2003 | Ludwig et al. |
| 2004/0119804 A1 | 6/2004 | Emslander et al. |
| 2004/0126708 A1 | 7/2004 | Jing et al. |
| 2004/0189772 A1 | 9/2004 | Arai |
| 2004/0213928 A1 | 10/2004 | Sebastian et al. |
| 2004/0241451 A1 | 12/2004 | Clark et al. |
| 2004/0258856 A1 | 12/2004 | Ylitalo et al. |
| 2005/0008861 A1 | 1/2005 | Yadav et al. |
| 2005/0078158 A1 | 4/2005 | Magdassi et al. |
| 2005/0103182 A1 | 5/2005 | Spurgeon |
| 2005/0225618 A1 | 10/2005 | Askeland et al. |
| 2005/0282928 A1 | 12/2005 | Lin et al. |
| 2006/0111466 A1 | 5/2006 | Bujard et al. |
| 2006/0132566 A1 | 6/2006 | Desie et al. |
| 2008/0063799 A1 | 3/2008 | Tennis et al. |

FOREIGN PATENT DOCUMENTS

| | | |
|---|---|---|
| WO | WO 01/68596 | 9/2001 |
| WO | WO 02/085638 | 10/2002 |
| WO | WO 03/018645 | 3/2003 |
| WO | WO 2004/035684 | 4/2004 |

METALLIC INK JET PRINTING SYSTEM FOR GRAPHICS APPLICATIONS

CROSS-REFERENCE TO RELATED APPLICATIONS

This Application is a Continuation of U.S. application Ser. No. 11/519,432, filed on Sep. 12, 2006, which claims priority to U.S. Provisional Application No. 60/716,378, filed on Sep. 12, 2005, and to U.S. Provisional Application No. 60/784,107, filed on Mar. 17, 2006. The disclosures of the above applications are incorporated herein by reference in their entirety.

INTRODUCTION

The present disclosure relates to ink jet ink systems, and more particularly, to inks having a metallic effect or appearance.

Today, many products are embossed or stamped with a metallic or gold foil looking material providing personalization and the appearance of a high quality product. Many popular products include stationery, books, labels, certificates, and decorative items, using a variety of substrates including plastics, leather, paper, and wood. Other products may include floor and wall tiles, furniture, automotive components, and various household goods. A number of techniques have been attempted using modern manufacturing capabilities to print metallic looking inks on these types of substrates, but cost, quality, and flexibility remain concerns.

The demand for increased personalization and shorter product runs cannot be economically achieved by current manufacturing methods. Current hot foil and similar manufacturing processes are slow, expensive and lack flexibility. Thermal transfer techniques using colored foils and ribbons have been used to create metallic effects; however, there are many problems with these processes. First, there is excessive waste of the colored foil or ribbons as one only prints from a small area of the ribbon, leaving a potentially high amount of waste, or unused ribbon. Second, due to the rough surface of many of the different substrates to be printed on, the thermal transfer process does not always work effectively, for example, on rough surfaces and areas where the foil/ribbon cannot adhere to the substrate properly.

SUMMARY

In various embodiments, the present disclosure provides a multi-phase system of compositions and methods for creating a metallic effect on a substrate, preferably a non-metallic substrate. The system comprises applying a first ink jet ink onto the substrate to form a reflective coating layer. The first ink jet ink preferably comprises a dispersion of reflective metallic particles in a suitable carrier system. A second ink jet ink is then applied over the reflective coating layer to form a protective coating layer. In various embodiments, the second ink jet ink comprises at least one crosslinkable polymer.

In various embodiments, the present disclosure additionally provides an undercoat, or primer coating base layer, that is applied to the substrate prior to application of the first ink jet ink layer. The undercoat may be applied to the substrate, including a rough or uneven surface, to yield a smooth base surface that is substantially impervious to nanoparticulate metal. In various embodiments, the undercoat layer may be substantially transparent and colorless. In other embodiments, the undercoat layer may be substantially opaque. In various embodiments, the undercoat layer may comprise pigment and/or dye. To enhance printing to a substrate having a dark color, it may be advantageous in some embodiments to provide an undercoat having a white or other light colored pigment.

The present disclosure also provides methods of printing variable print having a metallic effect using an ink jet recording apparatus. A first ink jet ink comprising a nanodispersion of metallic particles is jetted onto the undercoat layer, or alternatively, directly onto the substrate to form a reflective coating layer and defining a boundary. The methods further provide overprinting a second ink jet ink over at least a portion of the reflective coating layer, wherein the second ink jet ink subsequently spreads across the reflective coating layer and up to the boundary, thereby forming a protective coating layer. The methods optionally comprise applying an undercoat layer onto a substrate prior to printing the first ink jet composition.

The present disclosure also provides methods of printing a variable print having a colored metallic effect using an ink jet recording apparatus. The methods comprise jetting a first ink jet ink onto a substrate to form a reflective coating layer, wherein the first ink jet ink includes from about 2% to about 10% by weight of a dispersion of silver particles having an average particle size of preferably less than about 50 nm, and in some embodiments, less than about 20 nm. A second ink jet ink is overprinted over the reflective layer to form a protective coating layer, wherein the second ink jet ink comprises at least one transparent colorant. In various embodiments, an undercoat, or primer coating base layer, is applied to the substrate prior to the application of the first ink jet ink layer.

The compositions and methods of the present disclosure provide benefits over compositions and methods among those known in the art, including one or more of allowing: economical printing of very small production runs (including customized printing); use of multiple spot colors and potentially a full gamut of process colors depending upon the printer configuration; application of metallic printing and finishes on a variety of substrates; application of print, indicia, or other graphics without adversely impacting the look and feel of the substrate; and imparting print, indicia, or other graphics on a substrate with an embossed appearance. Further areas of applicability of the present disclosure will become apparent from the description provided hereinafter.

DRAWINGS

Figure 1:
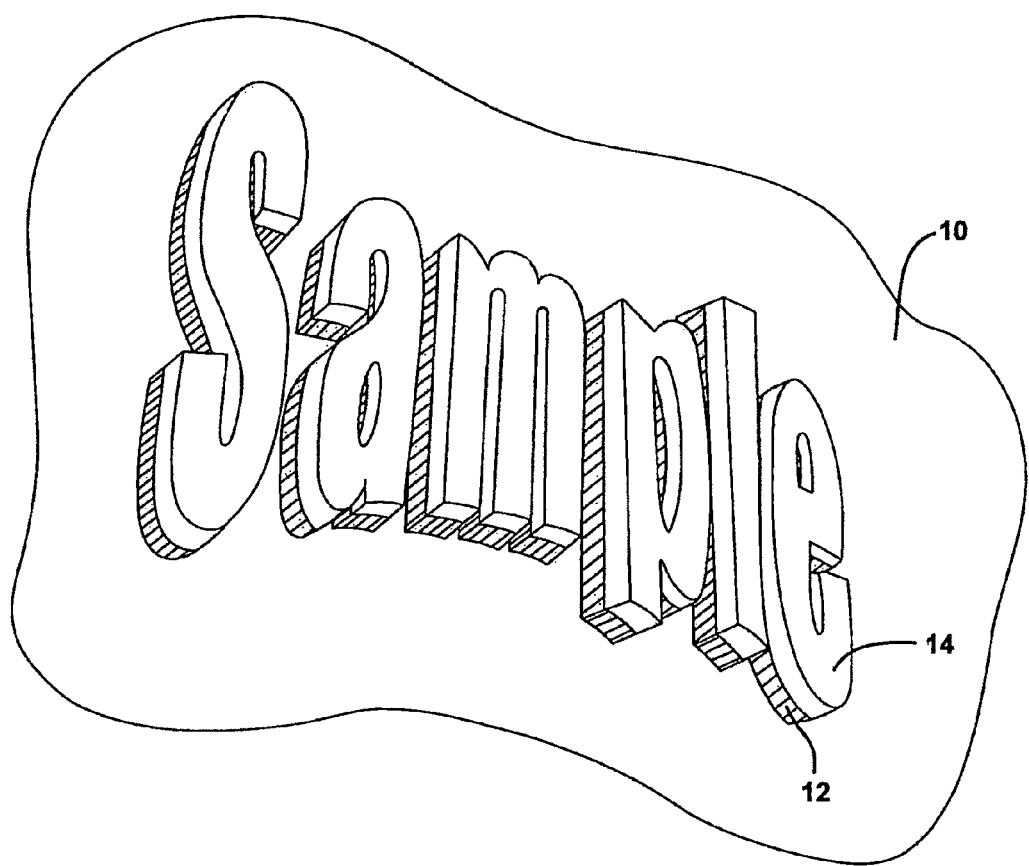
FIG. 1 is a perspective view illustrating a two-layer printed substrate according to one embodiment of the present disclosure.

It should be noted that the figures set forth herein are intended to exemplify the general characteristics of an apparatus, materials and methods among those of this disclosure, for the purpose of the description of such embodiments herein. These figures may not precisely reflect the characteristics of any given embodiment, and are not necessarily intended to define or limit specific embodiments within the scope of this disclosure.

DESCRIPTION

The following description of the embodiments is merely exemplary in nature and is in no way intended to limit the disclosure, its application, or uses. The following definitions and non-limiting guidelines must be considered in reviewing the description of this disclosure set forth herein.

The headings (such as "Introduction" and "Summary,") and any sub-headings used herein are intended only for general organization of topics within the disclosure, and are not intended to limit the disclosure or any aspect thereof. In particular, subject matter disclosed in the "Introduction" may include aspects of technology within the scope of the disclosure, and may not constitute a recitation of prior art. Subject matter disclosed in the "Summary" is not an exhaustive or complete disclosure of the entire scope of the invention or any embodiments thereof.

Any citation of references herein does not constitute an admission that those references are prior art or have any relevance to the patentability of the invention disclosed herein. References cited in the Description section of this specification are hereby incorporated by reference in their entirety.

The description and specific examples, while indicating embodiments of the disclosure, are intended for purposes of illustration only and are not intended to limit the scope of the disclosure. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this disclosure and, unless explicitly stated otherwise, are not intended to be a representation that given embodiments of this disclosure have, or have not, been made or tested.

As used herein, the words "preferred" and "preferably" refer to embodiments of the disclosure that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, the word "include," and its variants, is intended to be non-limiting, such that recitation of items in a list is not to the exclusion of other like items that may also be useful in the materials, compositions, devices, and methods of this disclosure.

Figure 2:
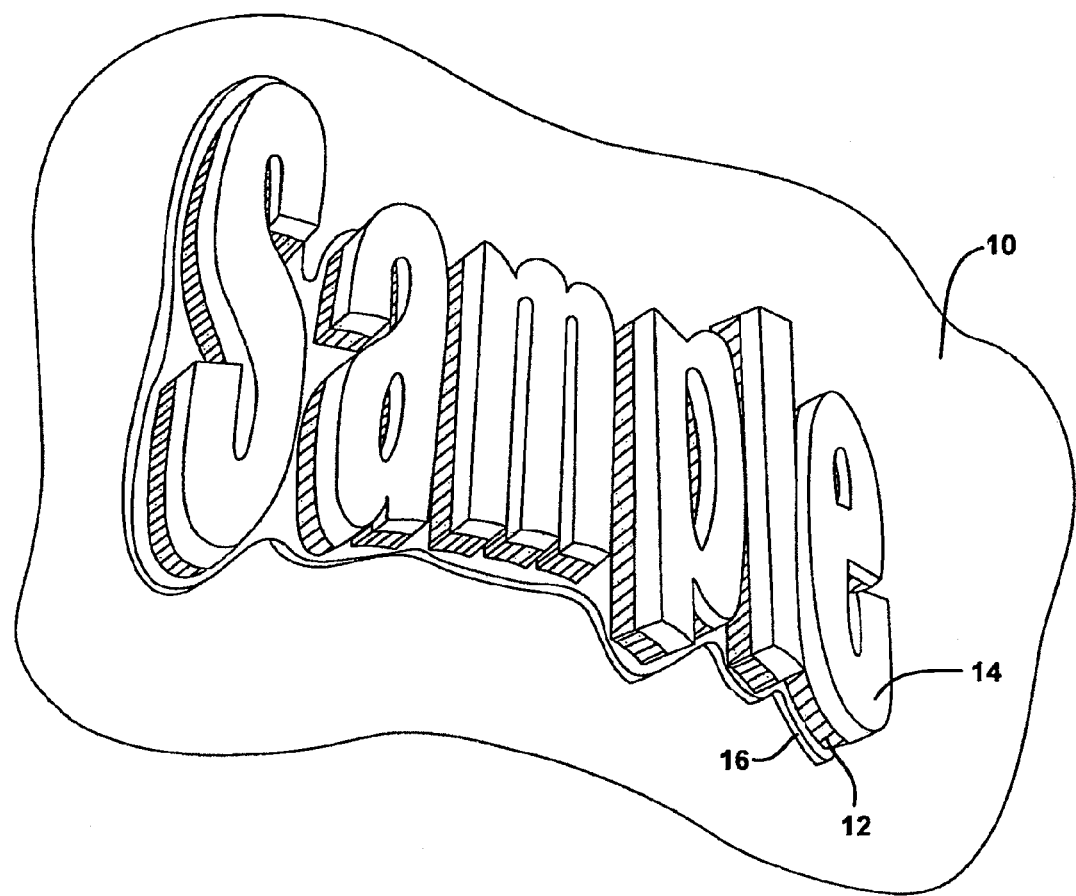
FIG. 2 is a perspective view illustrating a three-layer printed substrate according to one embodiment.
Figure 3:
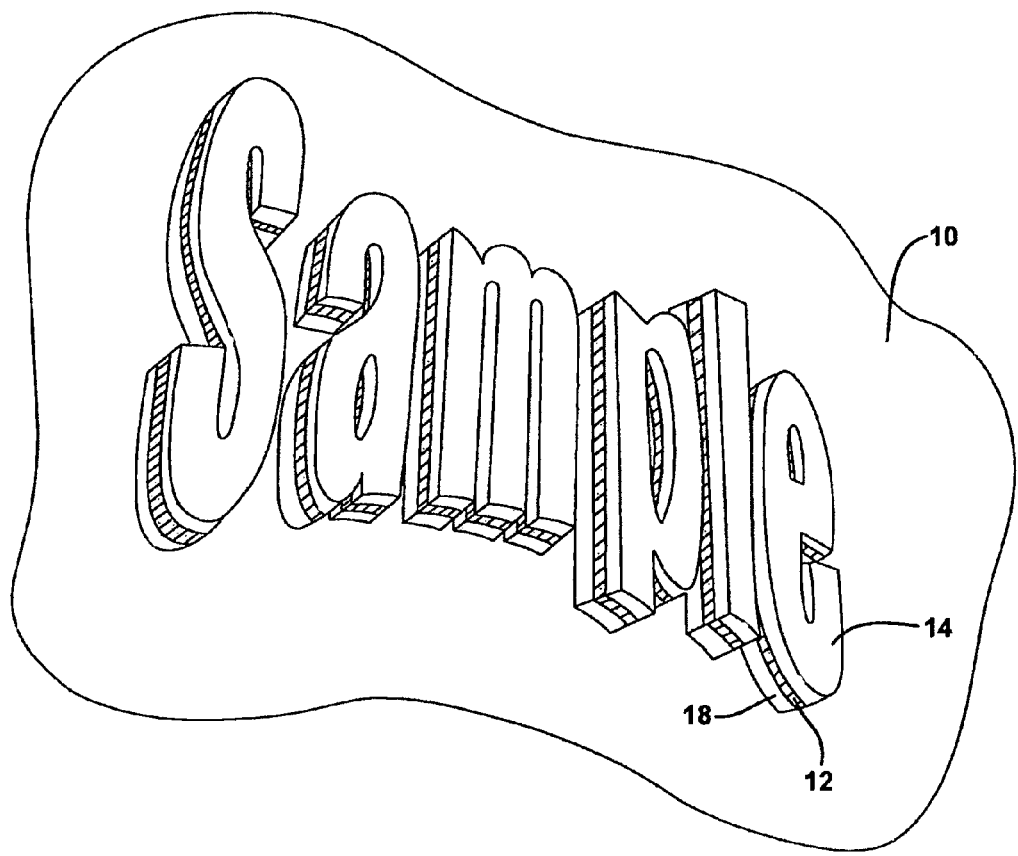
FIG. 3 is a perspective view illustrating a three-layer printed substrate according to another embodiment.

The present disclosure provides a multi-phase system for ink jet printing inks having a metallic effect and/or appearance onto a substrate. As illustrated in FIG. 1, a first ink jet ink is applied onto a substrate 10 and preferably comprises a dispersion of reflective metallic particles in a suitable carrier system to form a smooth reflective coating layer 12. A second ink jet ink is subsequently applied over the reflective coating layer 12 to form a protective coating layer 14. In various embodiments, the system optionally includes the application an undercoat 16, or primer coating base layer, onto the substrate 10 prior to the application of the first ink jet ink to form a substantially smooth surface that is substantially impervious to reflective metallic particles, such as nanoparticulate metal. FIG. 2 illustrates an undercoat layer 16 applied to the substrate wherein the reflective coating layer 12 is not fully registered with the undercoat layer 16. In this embodiment, the undercoat layer 16 does not have the exact shape of the intended final image. FIG. 3 illustrates another embodiment wherein the reflective coating layer 12 is substantially registered over the undercoat layer 18. In this embodiment, the undercoat layer 18 is applied having the intended final image shape. In various embodiments, the undercoat layer 16, 18, the second ink jet ink layer 14, or both, additionally impart color. As one skilled in the art should understand, the application of the undercoat in certain embodiments may be optional, and may not be necessary depending upon the specific substrate that is used.

Undercoat Primer Layer

Without limiting the mechanism, function or utility of the present disclosure, it may be desirable to apply the reflective ink jet ink coatings of the present disclosure to a variety of substrates ranging from smooth finishes, such as glass or mirrors, to rough, coarse, or uneven surfaces, such as leather, linen, and other cloth or semi-absorbent material. Certain other substrates that are normally smooth may be altered to have a desired "finished look," such as a matte finish, a leather-like grain, or embossment. Such substrates may not always be suitable for accepting a direct deposition of an ink containing reflective material. For example, if a metallic and/or reflective ink is applied to a rough, porous, or uneven surface, it may leave a disrupted or non-reflective appearing surface. In certain instances where a substrate exhibits even a slight degree of porosity, such a metallic or reflective ink may bleed into the substrate or leave a discolored, non-reflective, and/or uneven appearance. In order to minimize such an effect and to provide a highly reflective final finish, in various embodiments, an undercoat, or primer coating base layer is first applied to a substrate prior to the application of a reflective coating layer. It should be understood that the surface of the substrate should preferably be suitably free from foreign matter and may be cleaned prior to applying the coating.

The undercoat composition may be deposited as a layer on a substrate by any suitable method that can apply a continuous layer. In various embodiments, the undercoat composition comprises a suitable coating that will form a substantially smooth and non-absorbent layer upon which the reflective layer, when deposited, will show and exhibit reflectivity. In various embodiments, the layer may be jetted onto the substrate as an ink jet formulation using a standard ink jet printing head. In certain embodiments, the undercoat is glossy in appearance and is preferably not substantially absorbent of the nanoscale particles of the first ink jet composition (below). The undercoat layer may be applied having a thickness sufficient to provide a smooth finish over the substrate. Additionally, the thickness of the undercoat layer can be suitably selected in order to provide more of an embossed look, or textured feel of the final printed image if so desired. In various embodiments, the undercoat layer has a thickness of from about 1 to about 50 µm, preferably from about 5 to about 20 µm.

The undercoat composition used to form the primer coating layer may be substantially colorless or may include one or more colorant, such as dyes, pigments, and mixtures thereof. In various embodiments, the undercoat is clear and is preferably non-yellowing, particularly if exposed to actinic radiation during cure. In various other embodiments, the undercoat may impart a light color, particularly with a dark colored substrate, in order to provide an improved reflectivity. For example, in instances where the substrate is very dark, the metallic effect may be slightly diminished due to a certain amount of transmission through the silver layer. The metallic effect may be increased in this regard by making the undercoat white such that transmitted light is scattered back through the metallic coating. This white undercoat may be obtained, for example, by using titanium dioxide dispersed with a suitable dispersion in a UV Matrix. The number and kinds of any additional colorants will depend upon the undercoat being formulated and the undercoat composition may comprise from about 2% to about 40% of colorant by weight of the composition, as is discussed in more detail below. In various embodiments, the undercoat comprises from about 5% to about 20%, or from about 10% to about 15%, of colorant.

In various embodiments, the undercoat composition has a viscosity of between about 8 to about 12 centipoises at an inkjet head operating temperature of between about 25 to about 75° C. In order for the undercoat composition to spread well on a bare substrate, the liquid state of the composition should have a relatively low surface tension as compared to the substrate surface. A low surface tension radiation curable fluid can be obtained by adding suitable low surface energy monomers. Examples of such monomers include isodecyl acrylate, with a surface tension of about 28.6 dynes/cm; alkoxylated nonylphenol acrylate, with a surface tension of about 28.5 dynes/cm; and for a diacrylate monomer, propoxylated neopentyl glycol diacrylate, with a relatively low surface tension at 32 dynes/cm. In various embodiments, once dried and/or cured, the undercoat preferably exhibits a higher surface energy, enabling the reflective coating layer to effectively spread over the undercoat.

Reflective Coating Layer

In various embodiments, the reflective particles of the first ink jet ink comprise submicron powders and/or nanoparticles of a reflective metallic material. The metallic material can include various metals and preferably comprises a noble metal from the group consisting of gold, silver, platinum, and mixtures thereof. Other non-limiting examples of metallic materials useful with the present disclosure include aluminum, nickel, zinc, and titanium.

"Submicron powders", as used herein, include fine powders that simultaneously satisfy the following: particles with mean crystalline size less than 1 micron; and particles with aspect ratio between about 1 and about 1,000,000. For example, in some embodiments, submicron powders are powders comprised of particles with an average particle size of less than 500 nanometers and with aspect ratios ranging from 1 to 1,000,000. "Nanoparticles" (or "nanosize particles" or "nanoscale particles" or "nanopowder" or "nanophase particles" or "nanocrystals"), as the terms are used herein, include fine particles that have a mean crystalline size of less than about 250 nanometers; with an aspect ratio between about 1 and about 1,000,000. For example, in some embodiments, nanoparticles are powders comprised of particles with an average particle size of less than 100 nanometers (nm) and with aspect ratios ranging from 1 to 1,000,000. In various embodiments, the particles have an average particle size of less than about 100 nm, or less than about 50 nm, or less than about 20 nm, or less than about 10 nm.

The submicron and nanoscale particles used herein may be incorporated into inks by any known method. In one embodiment, a method of incorporating submicron and nanoscale particles into inks comprises (a) preparing nanoscale or submicron particles comprising silver, or another metallic material, by any method; (b) providing a base ink formulation; and (c) mixing the nanoscale or submicron particles with the ink. In yet another embodiment, the metallic nanoscale or submicron particles are pretreated to coat the powder surface for ease in dispersability and to promote homogeneity. In a further embodiment, a pre-existing formulation of an ink is mixed with nanoscale or submicron powders to functionalize the ink.

Nanoparticles comprising silver may sometimes be difficult to disperse in water or in solvents. In various preferred embodiments, the first ink jet ink comprising the metallic particles is substantially free from aggregated, agglomerated, and/or sintered particles. In certain embodiments, the dispersability of the nanoparticles may be enhanced by treating the surface of the metallic powders or other silver comprising nanoparticles. For example, fatty acids (e.g., propionic acid, stearic acid and oils) are applied to or with the nanoparticles to enhance the surface compatibility. If the silver comprising complex composition has an acidic surface, then ammonia, quaternary salts, or ammonium salts may be applied to the surface to achieve, desired surface pH. In other cases, an acetic acid wash may be used to achieve the target surface state. Trialkyl phosphates and phosphoric acid may be additionally applied in some applications to reduce dusting and chemical activity. Nanodispersions may be obtained from various sources, including Advanced Nanoproduct Co. Ltd, Cima Nanotech, and Cabot Superior Micropowders.

In general, the ink jet inks of the present disclosure are applied in a wet film thickness such that their conjoint curing results in coatings having the thicknesses that are advantageous and necessary for their functions. In order to maintain a desired reflective property, the silver or metal concentration can be adjusted, depending on the other ink components, to form a reflective coating layer preferably having a final thickness of at least about 10 nm, preferably at least about 15 nm.

In various embodiments, the metallic particles are provided in an amount of from about 1½% to about 20% by weight of the first ink jet ink, and more preferably, in an amount from about 2% to about 10% by weight of the first ink jet ink. The appropriate concentration and/or thickness will depend on many factors, including the specific components, such as the nanoparticles, solvent, image resolution, substrate, etc. In various embodiments, upon cure, the reflective coating is substantially non-conductive. It should be understood that the layer thickness and amount of the nanoparticles can be increased or decreased, depending on the design and selection of materials, and these variations are within the scope of the present disclosure in order to achieve a desired final result. For example, using a silver dispersion purchased from Cabot Superior Micropowders, an appropriate reflective effect is obtained through the use of a reflective coating layer of at least about 2% silver by weight to yield a 300 DPI image using an 80 Picoliter drop.

In addition to containing a desired metal nanodispersion, the first ink jet ink may contain a suitable carrier system, including a solvent vehicle, chosen to be compatible with the metal dispersion and with a suitable surface tension in order to achieve the desired substrate wetting. It should be understood that the selection of the solvent vehicle may be specific to the metallic particles, color(s), and/or substrate(s) used, and various different solvents can be used to tailor the final product as necessary. Non-limiting examples of solvents include hexyl alcohol, dipropylene glycol methyl ether, and propylene glycol methyl ether.

Protective Coating Layer

Once the reflective particle containing ink jet ink is applied to a substrate, or undercoat primer layer, and forms a reflective coating layer, the present disclosure provides a second ink jet ink applied over the reflective coating layer to form, in essence, a substantially transparent topcoat film or protective coating layer. In various embodiments, application of the second ink functions to protect the reflective metallic materials from oxidation, and to optionally impart one or more colors to create various metallic hues, such as gold, copper, platinum, and stainless steel, as well as full color variable print images. In various embodiments, the second ink jet ink comprises a film forming polymer, such as various crosslinkable polymers known in the art. In other embodiments, the second ink jet ink is energy curable, for example based on acrylate or cationic curing chemistries.

The second ink jet ink composition used to form the protective coating layer may be substantially colorless or may include one or more colorant, such as dyes, pigments, and mixtures thereof. The number and kinds of colorants will depend upon the ink being formulated and the ink may comprise from about 2% to about 10% of colorant by weight of the composition. It should be understood that the amount of pigment will depend, in part, on the colorant used. Preferably, for the purpose of enabling the reflective properties of the present disclosure, the final protective layer is transparent, especially clear, or substantially clear. Certain ink compositions typically will include one or a few colorants, or a set such as cyan, magenta, yellow, and black (CMYK), while others may include more complicated colorant packages and may be formulated in many colors, including colors that may increase the appearance of the metallic effect. It is contemplated that combinations of inks may be used to print full color variable images.

Various inorganic and organic dyes and pigments may be used with the second ink jet ink of the present disclosure. In general, pigments will have a maximum particle size that is small enough to avoid clogging the ink jets during printing. The pigments preferably have a narrow particle size distribution. Non-limiting examples of pigments that may be useful with the present disclosure include C.I. Pigment Yellow 74, 93, 95, 109, 110, 120, 128, 138, 139, 151, 154, 155, 173, 180, 185, and 193; C.I. Pigment Orange 34, 36, 43, 61, 63, and 71; C.I. Pigment Red 122, 202, 254; C.I. Pigment Blue 15:3, 15:4; C.I. Pigment Violet 19, 23, and 33; and C.I. Pigment Black 7. Non-limiting examples of dyes that may be useful with the present disclosure include Orasol yellow 2RLN, Orasol yellow 2GLN-M, Savinyl yellow, Savinyl scarlet RLS, Orasol red BL, and Orasol blue GN.

The ink jet ink used to create the protective coating layer may be formulated to provide a semi-gloss, or glossy appearance. It additionally provides durability and its thickness can be suitably increased so that it may afford an embossed or "raised feel", which adds quality to the overall impression of the printed image.

Curing

In various embodiments of the present disclosure, at least one of the undercoat, and the first and second ink jet inks are cured by exposure to actinic radiation, thermal energy, or both actinic radiation and thermal energy. Curing with actinic radiation takes place via groups containing bonds that can be activated with actinic radiation. In the context of the present disclosure, actinic radiation includes electromagnetic radiation, such as visible light, UV radiation or X-rays, and corpuscular radiation such as electron beams.

An acrylate UV curable ink will typically contain acrylate monomers. Non-limiting examples of preferred monomers include those selected from the group of monoacrylates including isodecyl acrylate; cyclic trimethyl propane formyl acrylate; diacrylates such as 1,6 hexanedioldiacrylate; propoxylated neopentyl diacrylate; triacrylates such as ethoxylated trimethylolpropane triacrylate or tetraacrylates, e.g., pentaerythritol tetraacrylate; and may contain higher functionality acrylates, such as dendrimers, e.g., BDE-1029 from Bomar. The ink may also contain small amounts of higher viscosity oligomers, as long as a suitable viscosity is maintained.

If cured by UV light, the composition will typically comprise at least one photoinitiator, or photoinitiator package. If present, the photoinitiator package typically comprises from about 5% to about 15% of the total mixture by weight. Non-limiting examples of photoinitiators include alphahydroxy ketones such as 1-hydroxy-cyclohexyl-phenyl-ketone; alpha aminoketones such as 2-benzyl-2-(dimethylamino)-1-(4-morpholinyl)phenyl)-1-butanone; acyl phosphines such as Diphenyl(2,4,6-trimethylbenzoyl)phosphine oxide; benzophenone derivatives; thioxanthones such as isopropylthioxanthone (ITX); and amine coinitiators such as ethyl-p-dimethyl amino benzoate. If cured by e-beam technology, no photoinitiator package would be required for an acrylate based ink.

A cationically cured ink may contain vinyl ethers such as triethylene glycol divinylether and/or aliphatic epoxies, such as the cycloaliphatic epoxide UVR-6105 commercially available from Dow Chemical in Midland, Mich., a colorant and additives as described above, and a photoinitiator package that contains arylsulfonium salts, such as Cyracure UVI-6992, or arylsulfonium hexafluoroantimonate salts, such as Cyracure UVI-6976, also both commercially from Dow Chemical.

In the context of the process of the disclosure, because of the large amount of particles that strongly absorb and/or scatter actinic radiation, the reflective coating layer may preferably be cured thermally. This is done using, preferably, the methods of thermal curing described below and, if desired, a dual cure, or the methods of curing with actinic radiation that are described below. The protective coating layer, following its application, is cured physically, thermally, or thermally and with actinic radiation. In various embodiments, the printing system of the present disclosure includes at least partially drying or curing the reflective coating layer prior to applying the second ink jet ink to form the protective coating layer. In certain embodiments, a predetermined rest period is provided between the application of the first and second inks.

In the case of thermal curing or dual cure of the transparent topcoat film, the underlying reflective coating layer may be cured as well, if it has not yet been cured or has been only partly cured (wet-on-wet technique).

In various embodiments, the methods of the present disclosure comprise continuous in-line processes. In certain embodiments, curing may take place after a predetermined rest period. In various embodiments, the rest period may have a duration of from about 1 second to 2 hours or greater, preferably from about 5 seconds to about 2 minutes, more preferably from about 5 seconds to about 1 minute. The rest period is used, for example, for leveling and/or devolatilization of the coatings and for evaporation of any volatile constituents such as water and any solvents that may be present (flashing off). The rest period or flashing off may be shortened and/or assisted by the application of elevated temperatures of up to about 90° C. and/or by a reduced atmospheric humidity<10 g water/kg air, especially <5 g/kg air, provided this does not entail any damage or alteration to the coatings, such as premature complete crosslinking.

The thermal curing does not generally have special features as to its method but instead takes place in accordance with the customary and known methods such as heating in a convection oven or irradiation with IR lamps. As with the curing with actinic radiation, described below, the thermal curing may also take place in stages.

Typically, in the case of two-component or multicomponent systems, the thermal curing takes place preferably at temperatures below about 100° C., preferably below about 80° C.

Curing with actinic radiation is carried out using the customary and known radiation sources and optical auxiliary measures. Non-limiting examples of suitable radiation sources include high-pressure or low-pressure mercury vapor lamps, with or without doping, or electron beam sources. Their arrangement is known in principle and may be adapted to the circumstances of the workpiece (substrate to be printed) and the process parameters.

Curing here may take place in stages, i.e., by multiple exposure to light or actinic radiation. It can also take place in alternation, i.e., by curing alternately with UV radiation and electron beams. Where thermal curing and curing with actinic radiation are employed together, these methods may be used simultaneously or in alternation. Where the two curing methods are used alternatively, it is possible, for example, to commence with the thermal curing and to end with the curing with actinic radiation. In other cases it may prove advantageous to commence and to end with curing with actinic radiation. In certain embodiments, advantages result if the protective coating layer is cured in two separate process steps, first actinic radiation and then thermally.

Coating Composition Properties

The viscosity and surface tension of the undercoat, first ink jet ink, and second ink jet ink compositions used in the present disclosure are preferably appropriate for jetting from conventional printheads and provide advantageous properties including stable pigment dispersions, lightfastness, compatibility with industrial printer components, the capability of being printed with relatively low maintenance (e.g., cleaning or replacing equipment), and can be printed on a wide range of substrates, such as paper, vinyl, leather, cloth, glass, metal, plastics, concrete, wood, and other desired substrates including both porous and non-porous media. The viscosity may range from about 2 to about 20 Centipoises at the jetting temperature. Typical jetting temperatures are preferably between room temperature of about 20° C. up to about 70° C. It should be understood that the viscosity and surface tension can be adjusted appropriately for printing under other conditions.

The compositions of the present disclosure may further include suitable additives that enhance the wetting of the substrate, including surfactants, plasticizers, diluents, wetting agents, and leveling agents known to those skilled in the art. Non-limiting examples include crosslinkable silicone acrylates such as Tegorad 2100; a polydimethyl siloxane, such as Byk-333; or a leveling additive such as Byk-381, available from Byk-Chemie. Additionally, the inks may also include appropriate binder agents. The binder may include one or more resins and/or polymers, such as an acrylic copolymer with an appropriate glass transition temperature $T_g$. Acrylic copolymers may be useful when printing on vinyl substrates, plastic, or other non-porous substrates for improved adhesion.

In preferred embodiments of the present disclosure, it may be desirable to formulate the inks such that the first ink jet ink easily spreads along the surface of the undercoat layer, and at the same time does not spread well on the substrate surface. Similarly, it may be desirable that the second ink jet ink easily spreads along the surface of the reflective coating layer, and likewise does not spread well on the substrate surface. For example, in certain embodiments, it is preferred to have an undercoat and/or reflective coating layer that exhibit a first surface free energy and a substrate that exhibits a second surface free energy, wherein the first surface free energy is greater than the second surface free energy. As used herein, the surface free energy of a solid surface is defined as the energy required to increase the surface area of the liquid at a liquid-solid interface. As is known in the art, various theories describe the surface energy of a solid as being equal to the surface tension of greatest value of the liquid that fully wets on the solid resulting in a contact angle of zero degrees. In various embodiments, it may be preferred to provide a second ink jet ink that forms a first contact angle with the reflective coating layer and forms a second contact angle with the substrate, wherein the first contact angle is less than the second contact angle. It should also be noted, however, that the roughness of a material has an effect on the way a liquid will wet on a surface. Therefore, the roughness and other properties of specific substrates, such as polarity, should also be taken into account in the formulations of the inks made in accordance with the present disclosure.

In various embodiments, the reflective coating layer is heated to provide a smooth metallic-like surface having a high surface energy. The relative high surface energy surface of the reflective coating layer enables a suitably formulated second ink jet ink to evenly spread across the surface, towards the edges of the printed image. For example, when a droplet of the second ink jet ink is placed on an area near the edge of the printed image, the drop spreads to the edge and follows the border of the metallic print up to the substrate. This enables the second ink jet ink to be applied or registered over only a portion of the reflective coating layer, taking into account the spreading characteristics of the reflective coating surface to completely overlay the image with the second ink jet ink. Thus in certain embodiments, the reflective coating layer can be applied defining a border adjacent the substrate, and the second ink jet ink can be jetted in a center region of the reflective coating layer, such that the second ink jet ink spreads across the reflective coating layer and up to the border, not reaching the substrate. It should be noted that in other embodiments, it may still be desirable to register the second ink over an entirety of the reflective coating layer surface.

In certain embodiments, the second ink jet ink forms a contact angle with the reflective coating layer of less than about 10 degrees, while forming a contact angle of more than about 15 degrees with the substrate. These embodiments further promote the spreading of the second ink across the reflective layer and minimize spread on the substrate.

To further enhance the spreading effect, the ink can be printed at a higher DPI, particularly in the process direction. If the second ink jet ink is cured with actinic radiation, the spread of the ink can be controlled as a function of cure. For example, the method of the disclosure can further include varying the amount of time between overprinting the second ink jet ink and applying the actinic radiation. A greater amount of time elapsed between the two steps will allow the ink to spread further along the reflective coating layer. Similarly, decreasing the amount of time between jetting and applying the actinic radiation will cure the protective coating layer faster. Subsequently, this variable may require adjusting as the ink may not have the opportunity to cover the entire reflective coating surface.

Compositions and methods among those of the present disclosure are exemplified by the following non-limiting example.

Example

An undercoat, or primer coating, is deposited onto a substrate having an uneven or rough surface. The coating is applied using a Spectra Nova AAA printhead printing at about 278 DPI. The undercoat is printed in a pattern and cured using mercury lamp. The undercoat yields a uniform smooth layer that is generally impervious to nanoparticulate metal.

Clear Undercoat Composition
- 50% Ethoxylated (3) trimethylpropane triacrylate (SR 454 Sartomer)
- 38% 1,6, Hexanediol diacrylate (SR 238 Sartomer)
- 4% N-methyl diethanol amine (amine synergist)
- 4% 2,4,6 trimethyl benzoyl diphenyl phosphine oxide (TPO from BASF)
- 4% 1-Hydroxy-cyclohexyl-phenyl-ketone (Irgacure 184 from Ciba)

After curing, a first ink layer is ink jetted on the undercoat and dried with an IR heater.

First Ink Composition
- 20% Silver ink dispersion AG-IJ-100-S1
- 40% Propylene glycol monomethyl ether
- 5% Propylene glycol
- 35% Ethylene glycol monomethyl ether This ink dries under an IR heater to yield a reflective silver image. After drying, a second ink overcoat is jetted in registration on the image.

Second Ink Composition
- 30% Propoxylated neopentyl glycol diacrylate
- 20% Ethoxylated trimethyloylpropanr triacrylate
- 37% 1,6 hexanediol diacrylate
- 5.5% Orosol yellow (dye)
- 0.5 Byk 333 (wetting agent)
- 2% Irgacure 369 (photoinitiator)
- 5% Darocur 1173 (Photoinitiator)

The examples and other embodiments described herein are exemplary and not intended to be limiting in describing the full scope of compositions and methods of this disclosure. Equivalent changes, modifications and variations of specific embodiments, materials, compositions and methods may be made within the scope of the present disclosure, with substantially similar results.

What is claimed is:

1. A printing system for creating a metallic effect image on a substrate having a surface, the system comprising:
   an undercoat layer applied onto at least a portion of the surface of the substrate to yield a smooth base surface that is substantially impervious to nanoparticulate metal;
   a first ink jet ink applied onto the undercoat layer, the first ink jet ink comprising a dispersion of reflective metallic nanoparticles having an average particle size of less than about 50 nm in a suitable carrier system, wherein the first ink jet ink forms a reflective coating layer having a thickness of at least about 10 nm upon curing; and
   a second ink jet ink comprising at least one crosslinkable polymer applied over the reflective coating layer that forms a protective coating layer.

2. The printing system of claim 1, wherein the undercoat layer is dried or cured prior to applying the first ink jet ink.

3. The printing system of claim 1, wherein the undercoat layer comprises a glossy finish.

4. The printing system of claim 1, wherein the formed reflective coating layer defines a boundary, and wherein the applied second ink jet ink spreads across the formed reflective coating layer up to the boundary to form the protective coating layer.

5. The printing system of claim 1, wherein the undercoat layer is sufficiently thick enough to provide a smooth finish over the substrate.

6. The printing system of claim 1, wherein the undercoat layer is jetted through a printhead onto the substrate, the undercoat layer having a thickness of from about 5 μm to about 20 μm.

7. The printing system of claim 6, wherein the undercoat composition has a viscosity of between about 8 to about 12 centipoises at from about 25° C. to about 70° C.

8. The printing system of claim 6, wherein the undercoat composition comprises at least one low surface energy monomer.

9. The printing system of claim 8, wherein the monomer is selected from the group consisting of: isodecyl acrylate, alkoxylated nonylphenol acrylate, and propoxylated neopentyl glycol diacrylate.

10. The printing system of claim 1, wherein the first ink jet ink is registered over an entirety of the undercoat layer.

11. The printing system of claim 1, wherein the undercoat layer and the reflective coating layer are at least partially dried or cured prior to applying the second ink jet ink.

12. The printing system of claim 1, wherein a rest period occurs between applying the undercoat and the first and second ink jet inks.

13. The printing system of claim 1, wherein the undercoat layer is substantially colorless.

14. The printing system of claim 1, wherein the undercoat layer comprises at least one of a colorant and a pigment.

15. The printing system of claim 14, wherein the colorant comprises titanium dioxide.

16. The printing system of claim 1, wherein at least one of the undercoat and first and second ink jet inks comprises a photoinitiator.

17. The printing system of claim 1, wherein the substrate comprises any of leather, cloth, or semi-absorbent material.

18. The printing system of claim 1, wherein the first ink jet ink further comprises one or more fatty acids to enhance surface compatibility of the reflective metallic nanoparticles.

19. The printing system of claim 1, wherein the surface of the substrate comprises any of a rough or uneven surface.

20. A method for creating a metallic effect image, comprising the steps of:
   providing a substrate having a surface;
   applying an undercoat layer onto at least a portion of the surface of the substrate to yield a smooth base surface that is substantially impervious to nanoparticulate metal;
   jetting a first ink jet ink onto the undercoat layer, the first ink jet ink comprising a dispersion of reflective metallic nanoparticles having an average particle size of less than about 50 nm in a suitable carrier system;
   curing the first ink jet ink to form a reflective coating layer having a thickness of at least about 10 nm; and
   overprinting a second ink jet ink over the reflective coating layer to form a protective coating layer, wherein the second ink jet ink comprises at least one crosslinkable polymer.

21. The method of claim 20, wherein the substrate comprises any of leather, cloth, or semi-absorbent material.

22. The method of claim 20, wherein the first ink jet ink further comprises one or more fatty acids to enhance surface compatibility of the silver nanoparticles.

23. The method of claim 20, wherein the formed reflective coating layer defines a boundary, and wherein the applied second ink jet ink spreads across the formed reflective coating layer up to the boundary to form the protective coating layer.

24. The method of claim 20, wherein the first ink jet ink is registered over an entirety of the undercoat layer.

25. The method of claim 20, wherein the surface of the substrate comprises any of a rough or uneven surface.

26. The method of claim 20, wherein the reflective metallic nanoparticles comprise silver nanoparticles.

27. The method of claim 26, wherein the silver nanoparticles comprise about 2% to about 10% by weight of the dispersion.

28. The method of claim 20, wherein the step of applying the undercoat layer is performed by jetting the undercoat layer through a printhead.

* * * * *